US008526431B2

(12) United States Patent
Haran et al.

(10) Patent No.: US 8,526,431 B2
(45) Date of Patent: Sep. 3, 2013

(54) OPERATION METHODS IN AN ETHERNET PASSIVE OPTICAL NETWORK THAT INCLUDES A NETWORK UNIT WITH MULTIPLE ENTITIES

(75) Inventors: Onn Haran, San Jose, CA (US); Ariel Maislos, Sunnyvale, CA (US); Lior Khermosh, Givatayim (IL)

(73) Assignee: PMC-Sierra Israel Ltd., Herzeliya Pituach (IL)

( * ) Notice: Subject to any disclaimer, the term of this patent is extended or adjusted under 35 U.S.C. 154(b) by 0 days.

(21) Appl. No.: 13/461,812

(22) Filed: May 2, 2012

(65) Prior Publication Data

US 2012/0243872 A1 Sep. 27, 2012

Related U.S. Application Data

(60) Division of application No. 12/710,376, filed on Feb. 23, 2010, now Pat. No. 8,189,598, which is a continuation of application No. 10/525,745, filed as application No. PCT/IL03/00666 on Aug. 11, 2003, now Pat. No. 7,688,843.

(60) Provisional application No. 60/410,317, filed on Sep. 13, 2002, provisional application No. 60/413,170, filed on Sep. 25, 2002.

(51) Int. Cl.
*H04L 12/28* (2006.01)
*H04L 12/56* (2006.01)

(52) U.S. Cl.
CPC .................................... *H04L 45/00* (2013.01)
USPC ........................................................ 370/389

(58) Field of Classification Search
CPC ...................................................... H04L 45/00
USPC ................ 370/389, 392, 395.41, 395.2, 353, 370/398; 380/278; 709/395.2, 223
See application file for complete search history.

(56) References Cited

U.S. PATENT DOCUMENTS 6,023,467 A 2/2000 Abdelhamid et al.
6,236,996 B1 5/2001 Bapat et al.

(Continued)

OTHER PUBLICATIONS 802.3ah "Part 3: Carrier sense multiple access with collision detection (CSMA/CD) access method and physical layer specifications" IEEE Standard for Information Technology—Telecommunications and information exchange between systems—Local and Metropolitan area networks—Specific requirements. Sep. 2004. pp. 1-623.

(Continued)

*Primary Examiner* — Ricky Ngo
*Assistant Examiner* — Phuongchau B Nguyen
(74) *Attorney, Agent, or Firm* — Mark M. Friedman

(57) ABSTRACT

A method for registration of multiple entities belonging to a specific optical network unit (ONU). In one embodiment, the multiple entity registration method comprises checking by an optical line terminal (OLT) if a registration request message received from the specific ONU belongs to a certain grant, and based on the check result, registering an entity as either a first or as an additional entity of the specific ONU. In another embodiment, the method comprises checking by an OLT of a reserved value of a flags field inside a registration request message, and based on the check result, registering an entity as either a first or as an additional entity of the specific ONU. The knowledge by an OLT that multiple entities belong to a specific ONU is used for grant optimization and packet data flow optimization.

3 Claims, 10 Drawing Sheets

900 Receiving a packet From the OLT
902 Detecting if packet is destined to one of the user ports or broadcast
LLID matches one of the user ports
904 Transmitting packet to the user port
LLID is broadcast
906 Transmitting packet to all user ports 908 Receiving a packet from a user port
910 Learning the Source Address (SA)
912 Searching for the Destination Address (DA)
DA found is a different port
914 Transmitting packet to one of the user ports
DA is broadcast
918 Transmitting packet to all user ports and to OLT
DA not found
916 Transmitting packet to OLT

(56) References Cited

U.S. PATENT DOCUMENTS

| | | | | |
|---|---|---|---|---|
| 6,546,014 | B1 | 4/2003 | Kramer et al. | |
| 6,647,210 | B1 | 11/2003 | Toyoda et al. | |
| 6,728,248 | B1 | 4/2004 | Uchida et al. | |
| 6,778,557 | B1 | 8/2004 | Yuki et al. | |
| 6,807,188 | B1 | 10/2004 | Blahut et al. | |
| 6,831,981 | B2 | 12/2004 | Edasawa et al. | |
| 6,873,615 | B2 | 3/2005 | Ratzel | |
| 7,139,487 | B2 | 11/2006 | Kozaki et al. | |
| 7,187,678 | B2 | 3/2007 | Cunetto | |
| 7,230,926 | B2 | 6/2007 | Sutherland et al. | |
| 7,289,439 | B2 | 10/2007 | Lee et al. | |
| 7,301,968 | B2 | 11/2007 | Haran et al. | |
| 7,301,970 | B2 | 11/2007 | Kim et al. | |
| 7,330,654 | B2 | 2/2008 | Song | |
| 7,443,874 | B2 | 10/2008 | Asashiba et al. | |
| 7,688,843 | B2 * | 3/2010 | Haran et al. | 370/442 |
| 8,189,598 | B2 * | 5/2012 | Haran et al. | 370/395.41 |
| 2002/0051455 | A1 | 5/2002 | Lee | |
| 2003/0097435 | A1 | 5/2003 | Kwon et al. | |
| 2003/0137975 | A1 | 7/2003 | Song | |
| 2003/0190168 | A1 * | 10/2003 | Song et al. | 398/168 |
| 2004/0028409 | A1 | 2/2004 | Kim et al. | |
| 2012/0243872 | A1 * | 9/2012 | Haran et al. | 398/66 |

OTHER PUBLICATIONS 802.1D, IEEE Standard for Local Access Control (MAC) Bridges, IEEE Computer Society, Jun. 9, 2004, pp. 1-269.

International Telecommunication Union, ITU-T, Telecommunication Standardization Sector of ITU, G.983.4 “Series G: Transmission Systems and Media, Digital Systems and Networks” Digital sections and digital line system—Optical line systems for local access networks, Nov. 2001, 1-82.

G. Kramer et al, Ethernet passive Optical Network (epon): Building a next generation Optical Access Network IEEE communications Magazine, Feb. 2002, pp. 69-72.

Tang Shan et al. EPON Upstream Multiple Access Scheme Proceedings info-tech and Info-net 2001, Oct. 29-Nov. 1, 2001, pp. 274-276.

Glen Kramer et al., IPAC : A dynamic Protocol for Ethernet PON (EPON) IEEE Communication Magazine, Feb. 2002, pp. 75-77.

* cited by examiner

OPERATION METHODS IN AN ETHERNET PASSIVE OPTICAL NETWORK THAT INCLUDES A NETWORK UNIT WITH MULTIPLE ENTITIES

CROSS REFERENCE TO EXISTING APPLICATIONS

This is a Divisional of U.S. Ser. No. 12/710,376 filed Feb. 23, 2010, which is a Continuation of U.S. Ser. No. 10/525,745 filed Feb. 28, 2005, now U.S. Pat. No. 7,688,843, which is national phase of PCT/IL2003/00666 filed Aug. 11, 2003, which claims priority from U.S. Provisional Application No. 60/410,317 filed Sep. 13, 2002, and from U.S. Provisional Application No. 60/413,170 filed. Sep. 25, 2002.

FIELD OF THE INVENTION

The present invention relates generally to data access systems, and more particularly to methods for operating data access systems for Ethernet packet traffic over Passive Optical Networks (PONs), the methods using and taking advantage of the existence of optical network units with multiple entities.

BACKGROUND OF THE INVENTION

An Ethernet PON (EPON) is currently using 1 gigabit per second transport, which is suitable for very high-speed data applications, as well as for converged system support (telephone, video, etc.). The unprecedented amount of bandwidth is directed toward, and arriving from a single entity, the Optical Network Unit (ONU).

FIG. 1 shows a PON 100 that facilitates the transmission of data between an Optical Line Terminal (OLT) 102 and a plurality of ONUs. An ONU may include a single entity, e.g. ONUs 104 (A) and 106 (C), or an unlimited number of entities, e.g. ONUs 108 (B) and 110 (D). An entity inside an ONU may be a single user, a bundle of users as for example in a Multi Dwelling Unit (MDU) application, or a service, such as voice, video and data in a converged system. An OLT downlink transmission passes through passive optical splitters 112*a-c* and reaches all ONUs. An GNU uplink transmission passes through all the passive optical splitters located between the respective ONU and the OLT. For example, an uplink transmission between ONU 106 and OLT 102 passes through passive optical splitters 112*b* and 112*a*. Due to the physical properties of a passive optical splitter, only the OLT can receive the transmission from the ONU, while the other ONUs receive attenuated reflections. The uplink transmission employs time division multiplexing (TDM) to arbitrate between different entities transmitting at different times.

The existing IEEE 802.3 specification, which is incorporated herein by reference, defines a registration process, shown schematically in FIG. 2. The process as defined therein can handle only a single entity per ONU. An OLT transmits a registration GATE message dedicated for ONUs wishing to register. Unregistered ONUs respond with a register request (REGISTER_REQ) message. The REGISTER_REQ message includes a flags field, which acts as an operation code (opcode), as it determines the operations requested by this message. Several ONUs might attempt to register simultaneously. The transmissions might collide in what is marked as a "contention zone". The OLT continues the process by transmitting a REGISTER command and a second, regular GATE message. The second GATE message allows an ONU to answer with a register acknowledge (REGISTER_ACK) message.

An access network should enable provisioning, policing and accounting of each client. In applications where several users connect to a single switch, the contribution of each of a plurality of different user sources to the combined traffic cannot be distinguished. In an EPON application, which follows a request-grant based protocol, the service provider wishes to configure an OLT to control the quality of service (QoS) of the uplink traffic per user. The concept of QoS is well known, and described for example in for Asynchronous Transfer Machine (ATM) based systems in the ITU G.983.4 specification, which is incorporated herein by reference. In addition, any independent decisions made by an ONU that may cause degradation of performance and lead to an unstable scheduling algorithm, may confuse the OLT, which does not expect such independent decisions.

A simple existing solution to the data-handling problem is shown in FIG. 3*a*. The figure describes the behavior of a bridgeless ONU having a plurality of registered entities. The solution involves two processes. The process shown on the left (steps 300 till 308) describes the actions taken when a packet is received from an OLT. The process shown on the right (steps 310 and 312) describes the actions taken when a packet is received from one of a plurality of user ports. This solution does not use a bridge, and the traffic direction decision is based on multiplexing/demultiplexing (mux/demux).

The left process begins when a packet is received at step 300. In a comparison step 302, the packet preamble is compared with all the Logical Link Identifications (LLIDs) registered for this ONU, the LLIDs serving for path identification. That is, the packet is identified as directed to one of the user ports, or as "broadcast" i.e. directed to all ports. If a user port destination LLID is found but the broadcast bit is not set, the packet is directed to the user port associated with the LLID in step 304. If a user port destination LLID is found but the broadcast bit is set, the traffic is directed to all ports except the one that was found associated with the LLID in step 306. If the LLID is identified in step 302 as a "broadcast" LLID, then the packet is directed to all registered user ports in step 308. A packet received from any user port is handled at step 310. The packet is always transmitted to the OLT in step 312.

A major disadvantage of this solution is the fact that when two users want to communicate, the traffic has to go up to the OLT and then be reflected down. This increases the uplink traffic and decreases the network utilization, as it leads to upstream-downstream traffic collisions.

Another simple existing solution to the data-handling problem is shown in FIG. 3*b*. The figure describes the behavior of an ONU with a single registered entity, the ONU having a bridge. The bridge behavior is compliant with the IEEE 802.1D specification, which is incorporated herein by reference. This solution also involves two processes. The process shown on the left (steps 350 to 360) describes the actions taken by the ONU when a packet is received from an OLT. The process shown on the right (steps 362 to 370) describes the actions taken by the ONU when a packet is received from one of a plurality of user ports.

In the left process, a packet is received from the OLT in step 350. The packet preamble is compared with the LLID registered for this ONU in step 352, to check if the packet's destination is the specific ONU. If a match is found, the process continues with a Source Address (SA) learning step 354, in which the SA of the packet is learned and stored in a database as described in section 7.8 of the IEEE 802.1D specification. In a Destination Address (DA) search step 356, the DA of the packet is searched by the OLT inside the SA storage database mentioned above. If the search result is positive, and the DA is found in a database associated with one of the user ports, the data is transmitted specifically toward that port in step 360. Otherwise, the packet is transmitted to all user ports in step 358.

In the right process, a packet is received from one of the user ports in step 362. In step 364, the Source Address (SA) of the packet is learned from a user port and stored according to the IEEE802.1D specification, as mentioned above. This is followed by a DA search step 366 similar to step 356. If the search result is "negative" (no DA found), or the address is "broadcast", a command to transmit the packet to the OLT and to all user ports except the originating one is issued in step 372. If the search result is "positive" in the sense that the DA is learned from the OLT, the packet is transmitted only to the OLT in step 370. If the DA is learned from a user port that is not the originating port, the packet is transmitted toward that port in step 368.

The major drawbacks of this solution are the lack of ability on the part of the OLT to control the uplink bandwidth of each user, and the requirement to learn all OLT source addresses, which requires expensive memory storage.

Therefore, it is desirable to provide a segregation of traffic to several customers or services in an EPON, in which each customer or service can be handled separately, enabling finer management and bandwidth control. It is also highly desirable that the OLT control the ONU scheduling policing, allowing better control to the service provider, and avoiding the need for the user to configure correctly the queuing policy.

SUMMARY OF THE INVENTION

The present invention is of methods for registration of multiple entities belonging to one ONU, for improved data flow control involving the multiple entities ONU, and for grant optimization or "coalescence" in Ethernet passive optical networks involving the multiple entity ONU.

According to the present invention there is provided, in a PON that includes an OLT and a plurality of ONUs, a first embodiment of a method for registration of multiple entities belonging to a specific ONU. The first embodiment comprises the steps of checking, by the OLT, if a registration request message received from a specific ONU belongs to a certain grant, and based on the checking, deciding, by the OLT, to register an entity associated with the registration request as a first or as an additional entity of the specific ONU.

According to one feature in the first embodiment of the method for registration of multiple entities belonging to a specific ONU, the certain grant is either a discovery grant or a normal grant. If it is a normal grant, the step of deciding includes deciding to register the entity as an additional entity. If it is a discovery grant, the step of deciding includes deciding to register the entity as a first entity.

According to yet another feature in the first embodiment, the method further comprises a step of deleting all previously registered entities for the specific ONU.

According to the present invention there is provided, in a PON that includes an OLT and a plurality of ONUs, a second embodiment of a method for registration of multiple entities belonging to a specific ONU. The second embodiment comprises the steps of checking, by the OLT, of a flags field residing inside a registration request message received from the specific ONU, and based on the checking, deciding, by the OLT, to register an entity associated with the registration request as a first or as an additional entity of the specific ONU. According to one feature in the second embodiment of the method, the step of checking includes checking if the flags field marks an additional registration.

According to the present invention there is provided, in a passive optical network (PON) that includes an OLT and a plurality of ONUs, a third embodiment of a method for registration of multiple entities belonging to a specific ONU. The third embodiment comprises comprising the steps of providing each entity of the multiple entity ONU with a separate identifying media access control address, and performing sequentially a standard registration process for each entity using its separate identifying media access control address.

According to the present invention there is provided, in a PON that includes an OLT and a plurality of ONUs, a method for grant optimization by the OLT comprising the steps of: handling, by the OLT, of a current grant to a specific ONU, the current grant having a current grant content; storing the current grant content in a current grant variable; checking in a grant list, by the OLT, if an additional grant having an additional grant content belongs to the specific ONU; and, if the additional grant is found, coalescing the current grant content and the additional grant contents, whereby the coalescing removes the need to add additional optical overhead to the current grant content.

According to one feature in the grant optimization method of the present invention, the step of checking includes comparing, by the ONU, the current grant time of the current grant with the start grant time of the additional grant, and the step of coalescing includes leaving a laser ON, thereby not having to turn-OFF and turn-ON again the laser.

According to the present invention there is provided, in a PON that includes an OLT and a plurality of ONUs of which at least one is a multiple entity ONU having a bridge, a method for packet data flow optimization comprising the steps of: determining, by the ONU, if a packet originates from the OLT or from an originating user port; searching for a destination address of the packet; if said destination address is not found, transmitting the packet solely to the OLT; else, if the destination address is found, transmitting the packet to a destination selected from the group consisting of a destination user port other that the originating user port, and the combination of said OLT and all user ports except the originating user port, whereby the method removes the need for a source address learning by the ONU when the packet is received from the OLT According to one feature in the packet data flow optimization method, the transmitting of the packet solely to the OLT is followed by the OLT transmitting the packet to either all user ports except the originating port, or to a particular user.

According to another feature in the packet data flow optimization method of the present invention, if the destination address found in the step of searching is a broadcast address, the packet is transmitted to the OLT and to all user ports except the originating user port.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention provides, in various embodiments, methods for registration of multiple entities belonging to one ONU (also referred to as "multiple entity ONU registration method"), of data flow control or "data handling" involving the multiple entities ONU, and of grant optimization or "coalescence". These embodiments are now described in detail below.

Multiple Entity Registration

Figure 1:
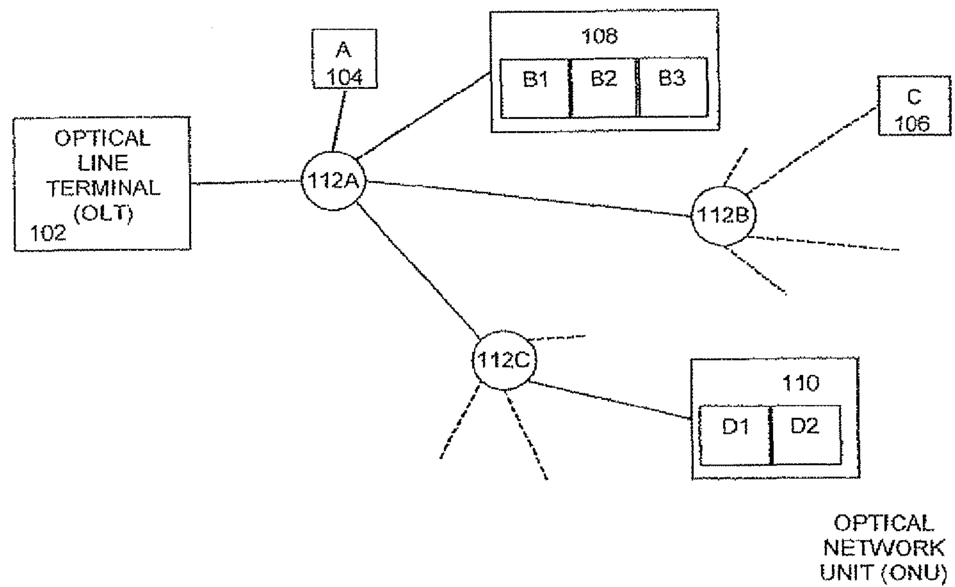
FIG. 1 shows schematically a Passive Optical Network.
Figure 2:
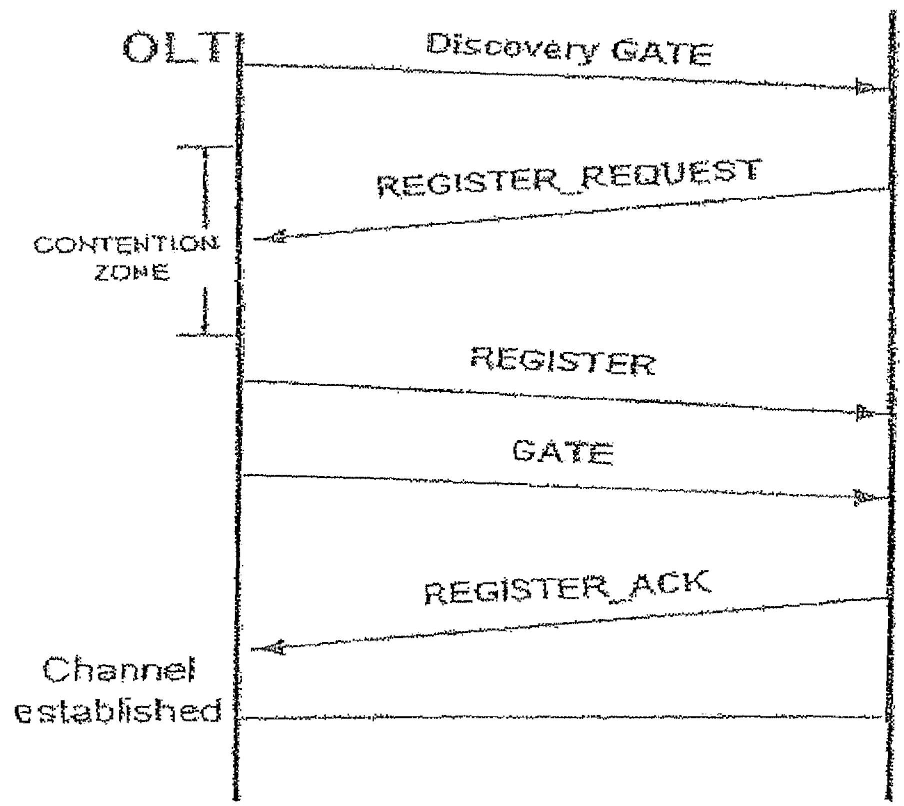
FIG. 2 is a flow diagram of discovery process messages as specified by the IEEE802.3 standardization body.

A first embodiment of the multiple entity ONU registration method of the present invention is to repeat the registration process of FIG. 2 several times, each time with a different Media Access Control (MAC) Address, which uniquely identifies each entity. The method is simple and does not require any knowledge from an OLT, which can be standard compliant, without enhancements. That is, the OLT will regard each entity as a different physical entity. The OLT can register an unlimited amount of physical devices, but is not able to discern that different entities belong to the same single ONU.

Figure 4:
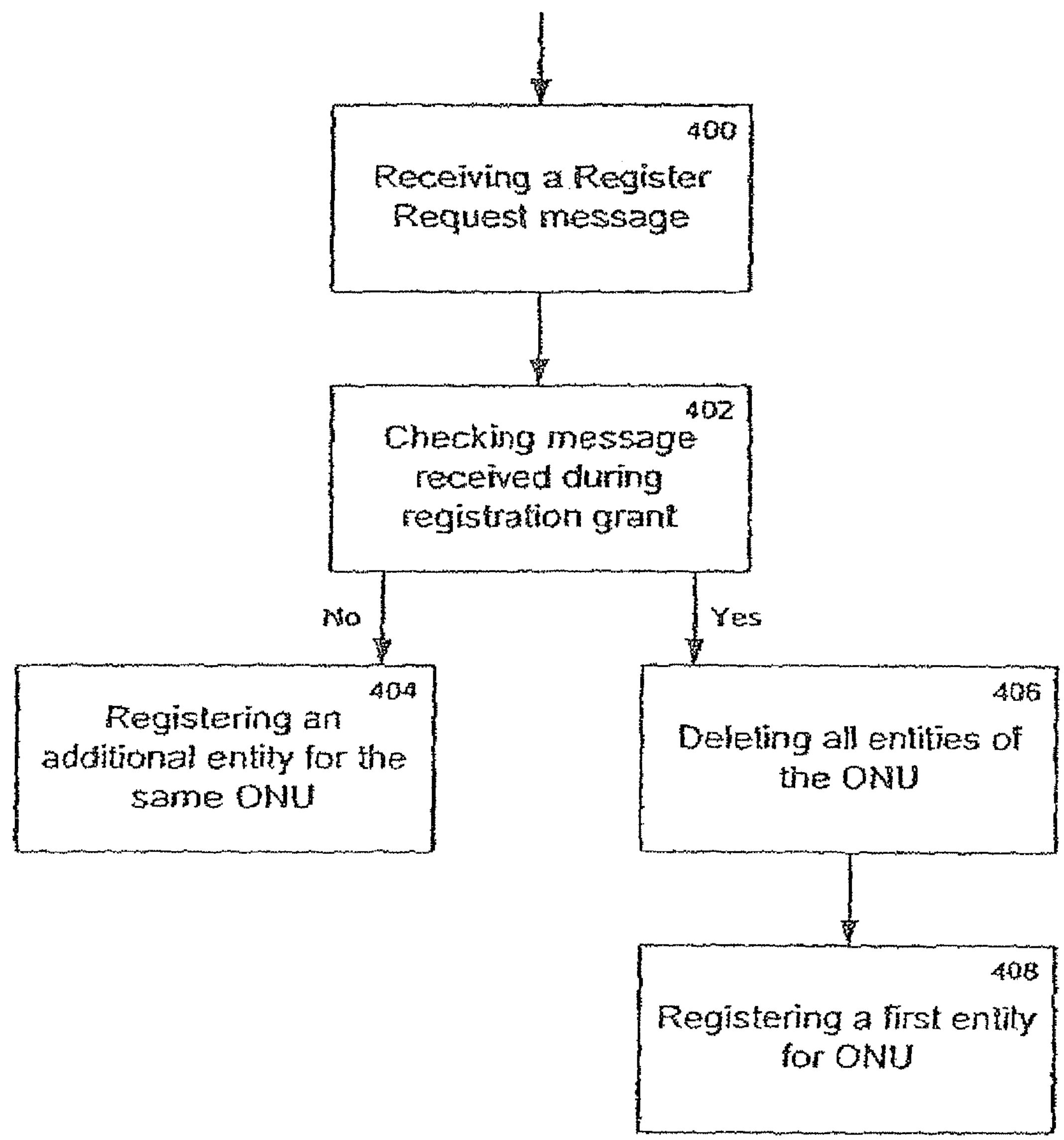
FIG. 4 shows a flow chart of an embodiment of the multiple entity ONU registration method of the present invention.

A second embodiment of the multiple entity ONU registration method of the present invention is shown in FIG. 4. In this embodiment, the ONU can register an additional entity on top of the existing one(s). While the process described in FIG. 4 relates to a single additional entity, it is clear that the process can be repeated several times to add multiple entities. The ONU uses one of its granting opportunities to transmit a REGISTER_REQ message with the ONUs own MAC address. The OLT receives this message in step 400. In step 402, the OLT checks whether the REGISTER_REQ message was received during a discovery grant opportunity (or simply "discovery grant"), or during a normal ("non-discovery") grant opportunity (or simply "normal grant"). If the message was received during a normal grant ("No"), then the OLT concludes that the ONU is already registered, and that the ONU wants to add an additional entity. The registration process of an additional entity for the same ONU by the OLT, based on the standard process depicted in FIG. 2, thus continues in step 404. If the REGISTER_REQ message was received during a discovery grant ("Yes"), then the OLT assumes this is the first entity registered for this ONU. Consequently, in step 406 the OLT deletes all the entities previously registered for this ONU, because no other entities should be registered if this is the first registration. The OLT then continues the registration process in step 408.

Figure 5:
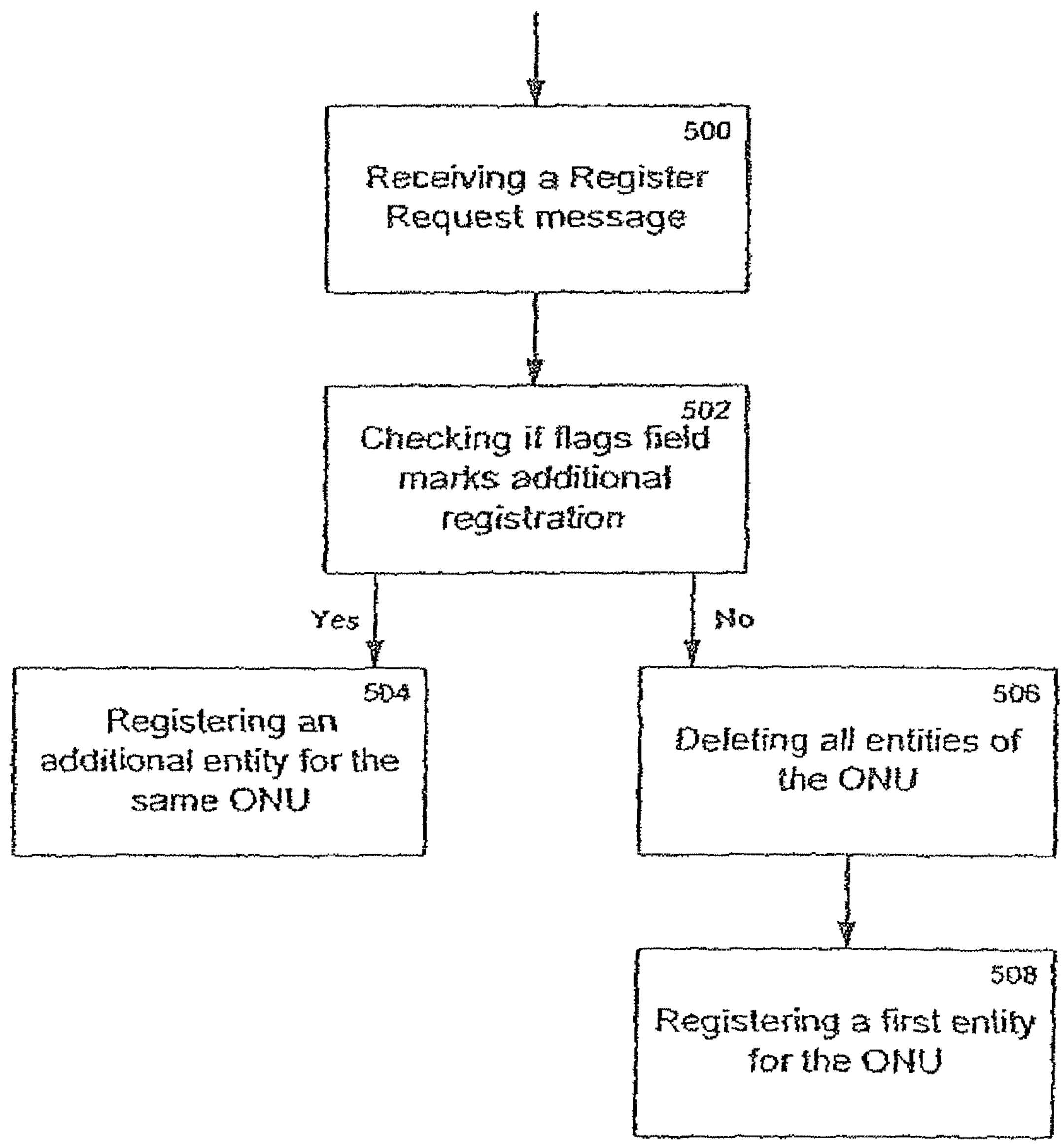
FIG. 5 shows a flow chart of another embodiment of the multiple entity ONU registration method of the present invention.

A third embodiment of the multiple entity ONU registration method of the present invention is shown in FIG. 5. It is based on using a reserved value between 4 and 255 of a flags field inside the REGISTER_REQ message, as explained below. The OLT receives a REGISTER_REQ message from an ONU in step 500. In step 502, the OLT checks the reserved value of the flags field, i.e. if the flags field marks an additional registration. If the reserved value is a new value defined for the additional registration, typically 5, the OLT concludes that this entity is an additional entity for the same ONU. Consequently, the OLT completes the registration process, using the standard flow depicted on FIG. 2, in step 504. If the flags value is 1, i.e. it indicates a first registration ("No"), then in step 506 the OLT deletes all the entities previously registered for this ONU, because no other entities should be registered if this is the first registration. The OLT then continues the process of registration in step 508.

Table 1 shows a format of a REGISTER_REQ message, as defined by the IEEE 802.3 specification. The table includes three columns: a field name, a field length, and a description of the field. The "description" column of the table describes the meaning of each field. The first row shows a 6 byte long address of an ONU under a "source address" field name. The next to last row shows a flags field, which is further elaborated in Table 2, where the specific values are described.

Table 2 shows in detail several reserved values of the flags field, which is the 6$^{th}$ field on the packet, as defined in Table 1. Rows 1 and 3 from the top have constant reserved values (0 and 2 respectively) that cannot be changed. The 5$^{th}$ row from the top in Table 2 is an "any value" row, which can assume any reserved value between 4 and 255, more typically 5, and can thus define new functionalities. Defining new reserved values for additional registrations will enable an OLT to realize that the registration attempt is for an additional entity of an existing ONU. Those skilled in the art will realize that there is one just way to add the functionality by defining one or more reserved values. However, those reserved values may assume many possible numbers.

TABLE 1

An example of a REGISTER_REQ message according to the IEEE802.3 specification

| Field name | Length | Description |
|---|---|---|
| Source Address | 6 bytes | Address of the ONU |
| Destination address | 6 bytes | Address of the OLT/multicast address |
| Packet type | 2 bytes | MAC control 0x8808 |
| MAC control opcode | 2 bytes | REGISTER_REQ_OPCODE |
| Timestamp | 4 bytes | Value of current local clock |
| Flags | 1 byte | Illustrated in table 2 |
| Pending grants | 1 byte | Number of future grants ONU may buffer |
| PAD | | Zeros padding |

TABLE 2

An exemplary definition of a flags field inside a REGISTER_REQ message

| Value | Indication | Comment |
|---|---|---|
| 0 | Reserved | Ignored on reception |
| 1 | Register | Registration attempt for ONU |
| 2 | Reserved | Ignored on reception |
| 3 | Deregister | Request to deregister an ONU |
| Any value between 4-255 | Reserved (for additional registration) | Registration for an additional entity per ONU |

In the second and third embodiments described above, the method of the present invention advantageously provides OLT operation optimizations based on the knowledge that several entities belong to a single ONU. These advantages include:

1. Assistance in maintenance, allowing to utilize physical alarm information of one entity (such as power alarm, temperature alarm, door open, etc.) as received from other entities.

2. Savings in optical overhead penalty, by coalescing successive grants to the same ONU (see "grant optimization" below). Grant penalties such as "laser-on", "AGC lock time", "CDR lock time", and "laser-off" will be paid only once and not per entity, since an ONU will know not to turn off the laser when a grant to one of its entities starts immediately after a grant to one of its other entities.

3. Multiple MAC addresses are not required, which reduces the cost required to acquire and maintain the addresses.

The optimizations are described and discussed in more detail below.

Figure 6:
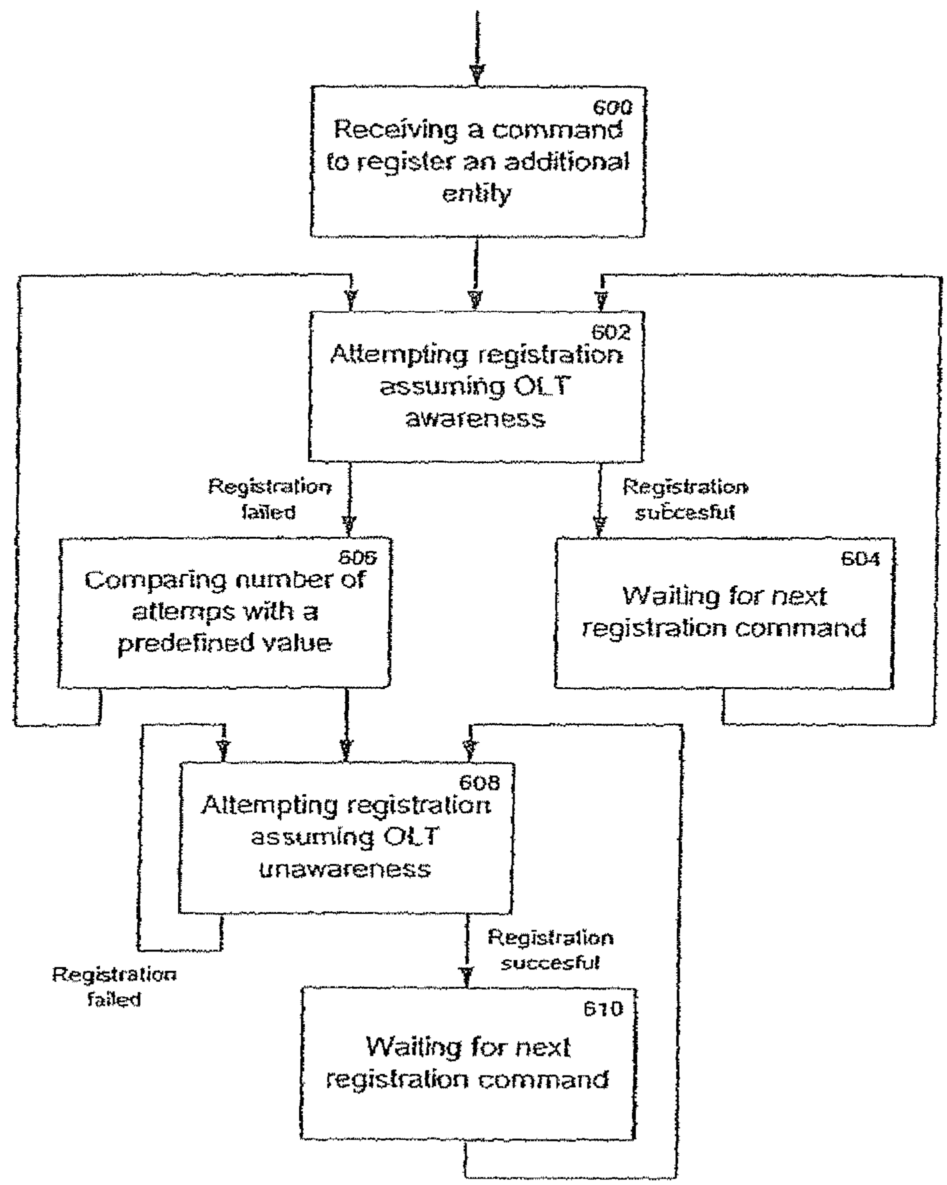
FIG. 6 is a flow chart of a procedure by which an ONU detects the OLT registration capability.

FIG. 6 is a flow chart of a procedure by which an ONU detects the OLT registration capability. From a system perspective, it is preferred to work in the second or third embodiment, but each of these embodiments require an awareness of the OLT to the fact that all entities are physically identical. In the procedure shown in FIG. 6, the ONU is enabled to detect if the OLT is aware to multiple entities registration, i.e. if the OLT knows how to bundle several entities as belonging to a single physical entity. In step 600, the ONU receives a command, which can arrive from a user or a management system, to register an additional entity. In step 602, having received such a command, the ONU attempts to register using the second or third registration options, which are the options that assume OLT awareness for an ONU having multiple entities. A successful registration leads to step 604, in which the operation is paused until a new command to register an additional entity arrives, and then execution returned to step 602. A failure in registration leads to step 606, where the number of registration attempts is being compared with a predefined value, e.g. 16. If the number of attempts in still smaller than the predefined value, the execution returns to step 602. Otherwise, the operation continues from step 608, where the ONU tries to register using option 1, in which the OLT doesn't associate the several entities registered with a single ONU. A failure in the registration will lead to an additional attempt in step 608. A success will lead to step 610, where operation is paused until a new command to register an additional entity arrives, and then execution returns to step 608.

In summary, advantageously and in contrast with existing methods, the multiple entity ONU registration method of the present invention includes an enabling step that allows an OLT to realize that a particular (or "specific") ONU is trying to register one or more additional entities. In the second embodiment above, this is achieved by the OLT checking of whether the REGISTER_REQ message was received during a discovery grant or during a normal grant in step 402. In the third embodiment above, this is achieved by the OLT checking the value of the flags field in step 502. The registration method disclosed herein allows the use of standard defined messages, e.g. messages defined by the IEEE 802.3 specification, but enhances the registration functionality to support multiple entities inside a single ONU with a single MAC address.

Grant Optimization

Figure 7:
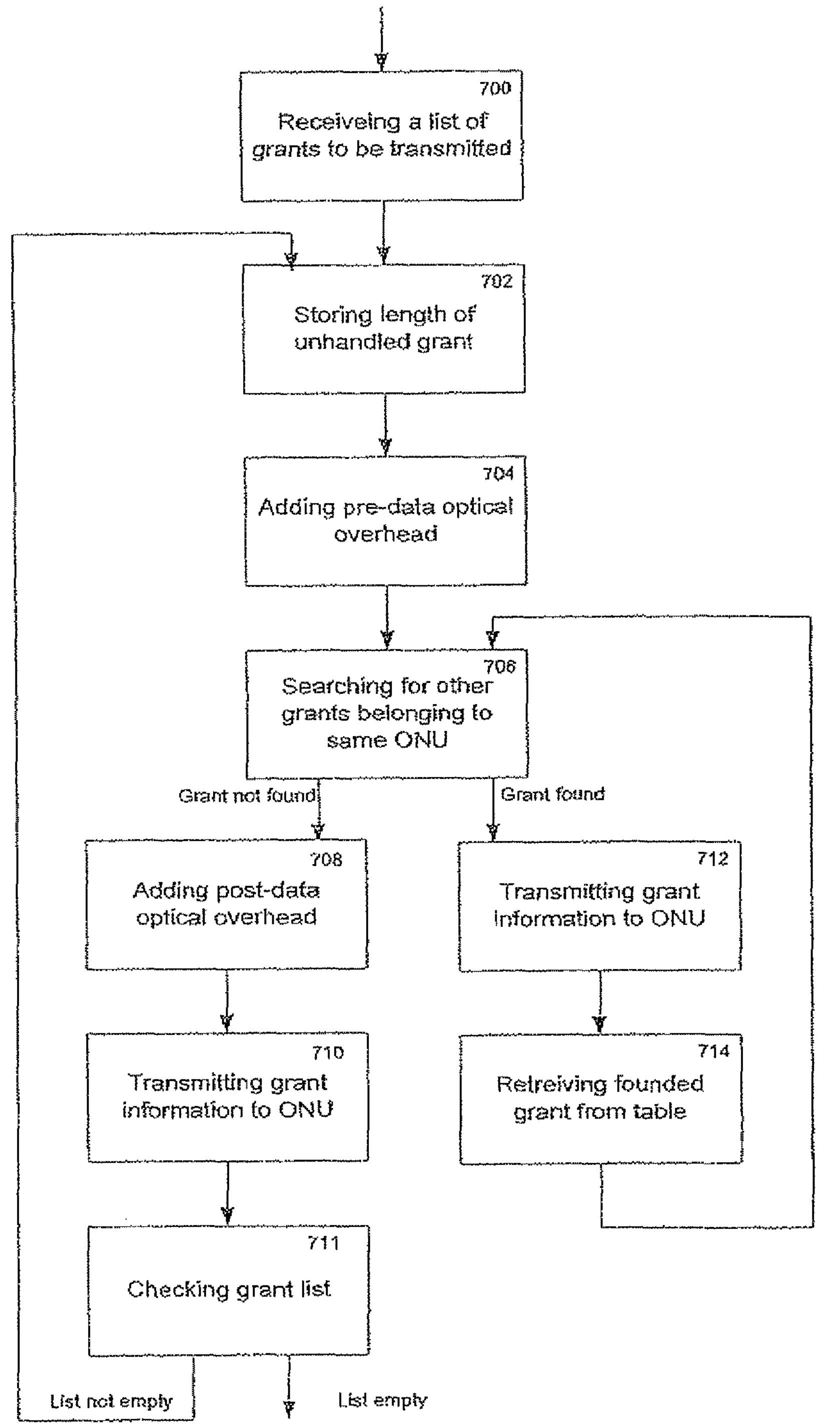
FIG. 7 shows a flow chart of a method for grant optimization by an OLT according to the present invention, in which multiple entities belonging to one ONU are taken into account.

FIG. 7 shows a flow chart of a method for grant optimization by an OLT according to the present invention, in which multiple entities belonging to one ONU are taken into account. In step 700, an OLT receives a list of all grants to be transmitted. In step 702, the OLT starts to handle a grant for an entity by retrieving an unhandled grant from the grant list, and storing its content in a current grant variable storage (or just "current grant variable"). It is understood that this grant (for this entity) was not handled previously. After handling by the OLT, the grant is deleted from the list, to avoid multiple handling. In step 704, before data transmission begins, the transmitted grant length in time units is combined by the OLT with optical overhead such as laser-on delay, CDR lock time, AGC lock time and comma synchronization. In step 706, the OLT searches for other grants belonging to this ONU. If other grants are not found (grant not found or "negative answer"), the OLT adds in step 708 additional optical overhead, e.g. laser-off delay time for grant termination. In step 710, the OLT transmits the grant information, as stored in the current grant variable, to the ONU. In step 711, the OLT checks the grant list. If the grant list is empty, the execution returns to step 700. If the grant list is not empty, the execution return to step 702. If one or more additional grants to the same ONU are found in the grant list (grant found or "positive answer") in step 706, in step 712 the OLT transmits the current grant information, as stored in the current grant variable, to the ONU. In step 714, an additional grant toward the same ONU is retrieved from the grant list, meaning the current grant variable (which has been emptied) is loaded with the additional grant parameters. The additional grant is deleted from the list to avoid multiple handling. The execution then returns to step 706. A key advantage is achieved here by the fact that in the case of a "positive answer", i.e. if one or more additional grants to the same ONU are found in step 706, the transmission of the current grant variable is NOT accompanied by the addition of optical overhead (i.e. step 708 is not performed). In other words, since step 712 in the multiple entity ONU case is equivalent to step 710 in the single entity ONU case, a step similar to step 708 is "saved" and does not exist in the multiple entity ONU case. Successive grants to different entities of the same ONU are thus transmitted successively while skipping the optical overhead addition in-between, a process termed grant coalescence.

Figure 8:
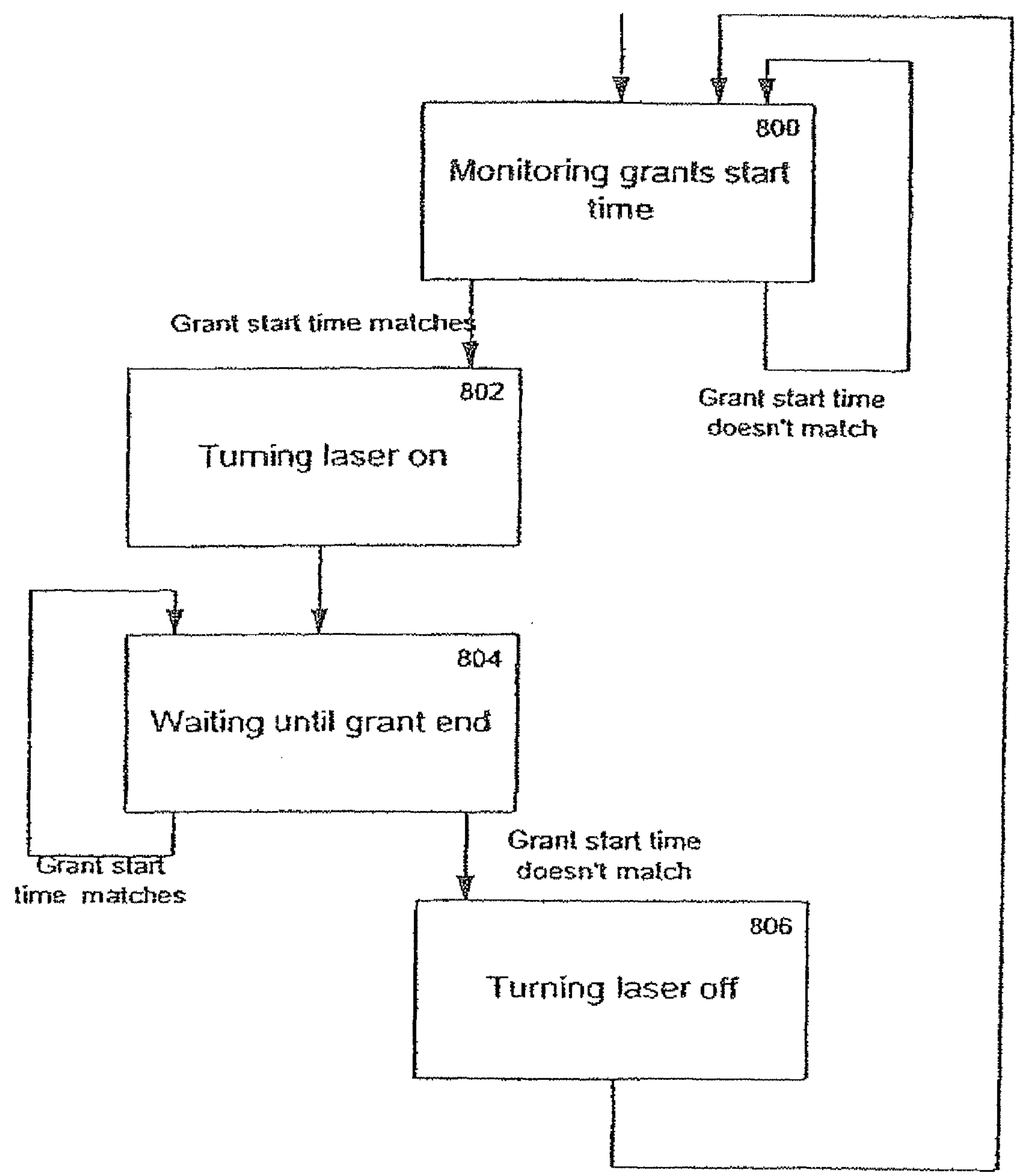
FIG. 8 shows a flow diagram of an ONU processing incoming grant messages, using the method for grant optimization of the present invention.

FIG. 8 shows a flow diagram of an ONU processing incoming grant messages, using the method for grant optimization of the present invention. The grant messages are stored in a table sorted by grant start time (not shown). In a monitoring step 800, a monitoring is performed for the earliest grant start time in the table, meaning the current time is compared with the start time of the next grant to start. If a match is found between the current time and the start time of the next grant to start, the laser is turned-on in step 802, and operation is paused to wait for optical overhead delays. In step 804, the ONU remains active until the running grant ends. If the ONU realizes before the end of the running grant that a new grant has to start immediately, the ONU leaves the laser ON in step 804 thus saving the turn-off and the new turn-on steps. This is also referred to as grant coalescence and is a major advantage in terms of system performance optimization. Otherwise, the laser is turned off in step 806, and operation is paused to wait for optical overhead delays. The execution is then repeated starting again from step 800.

In summary, advantageously and in contrast with existing methods, the multiple grant optimization method of the present invention facilitates an OLT decision to join grants to the same ONU. The OLT decision step includes the retrieval of an unhandled grant from a grant list, and the storage of the grant content in a current grant variable. In, addition, after handling by the OLT, the grant is deleted from the list, to avoid multiple handling. The resulting grant order is based on the order of (same) ONU entities, i.e. the grant start time of different ONU entities is consecutive. That is, no entities other than the different entities belonging to the same ONU are granted in between. The method also facilitates grant coalescence, i.e. the key ONU decision to leave a laser ON (instead of turning it OFF), if the ONU realizes before the end of the running grant that a new grant has to start immediately. The grant coalescence eliminates the optical overhead between grants belonging to different entities in the same ONU. Existing methods do not use grant coalescence because of the danger of potential loss of optical overhead when multiple entities are defined.

Data Flow Optimization

Figure 9:
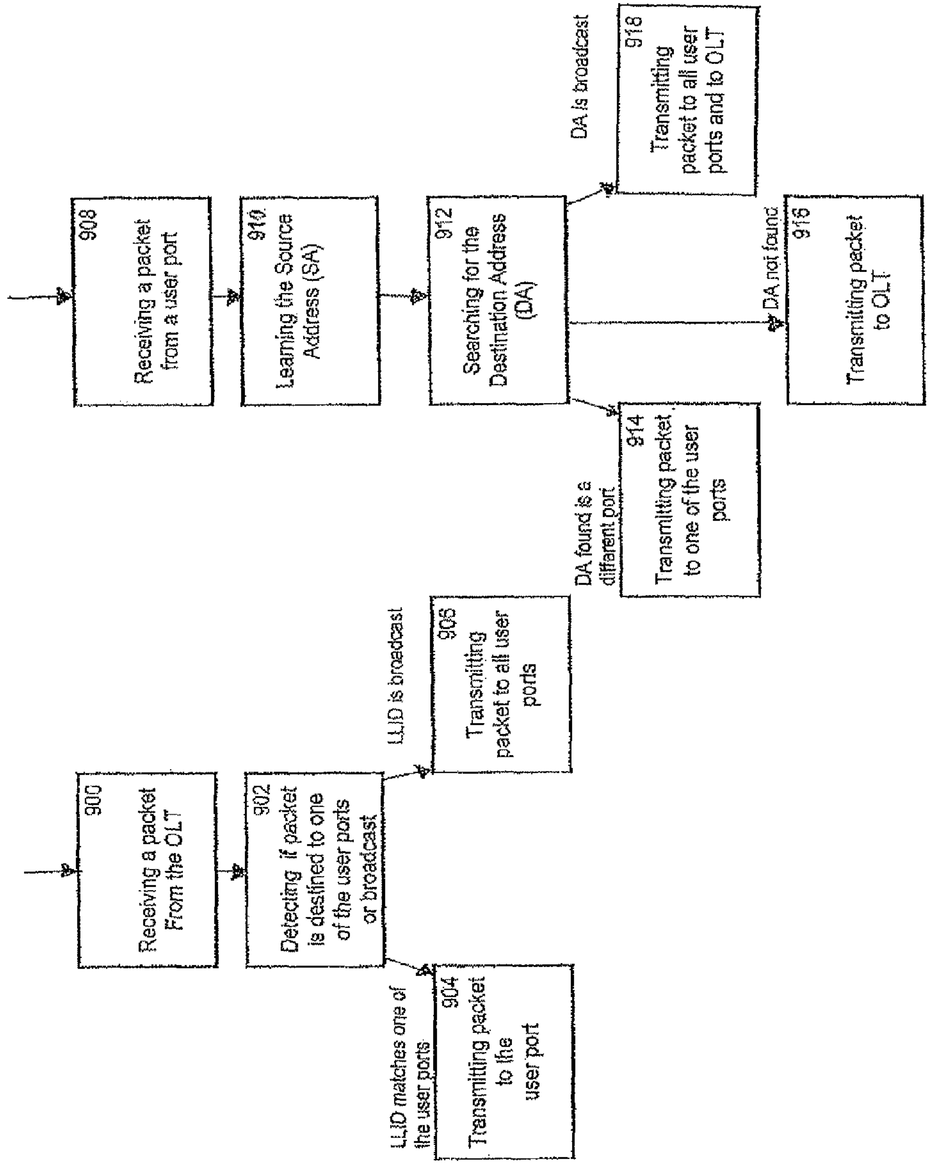
FIG. 9 shows an illustration of an efficient method for data flow optimization using a multiple entity ONU with a bridge.

FIG. 9 shows an illustration of an efficient method for data flow optimization using a multiple entity ONU with a bridge. The use of the multiple entity ONU with a bridge combines the benefits of a single entity ONU having a bridge and a multiple entity ONU without a bridge. The purpose of "bridging" is to define a specific set of rules to improve traffic utilization. A major innovative aspect here is the combination of a bridge that is implemented without SA learning from the OLT side. Without bridging, traffic from one entity to another in the same ONU will go through the OLT, which causes high delay, payment for uplink transmitted bandwidth, and inefficient system utilization.

Figure 3A:
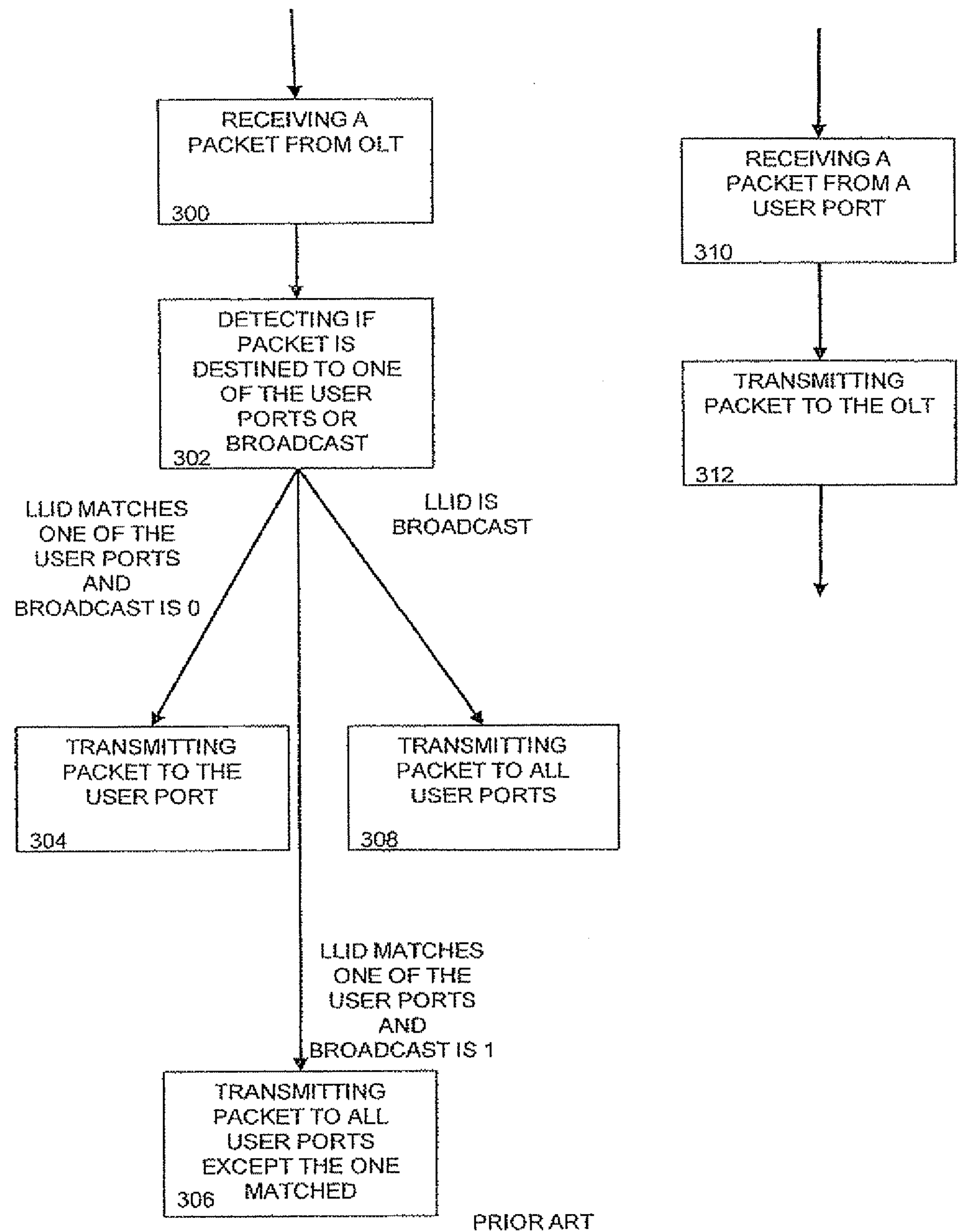
FIG. 3 is a flow diagram showing in (a) an existing data handling method for an ONU having no bridge and having multiple LLIDs, and in (b) an existing data handling method for a ONU having a bridge and a single LLID.
Figure 3B:
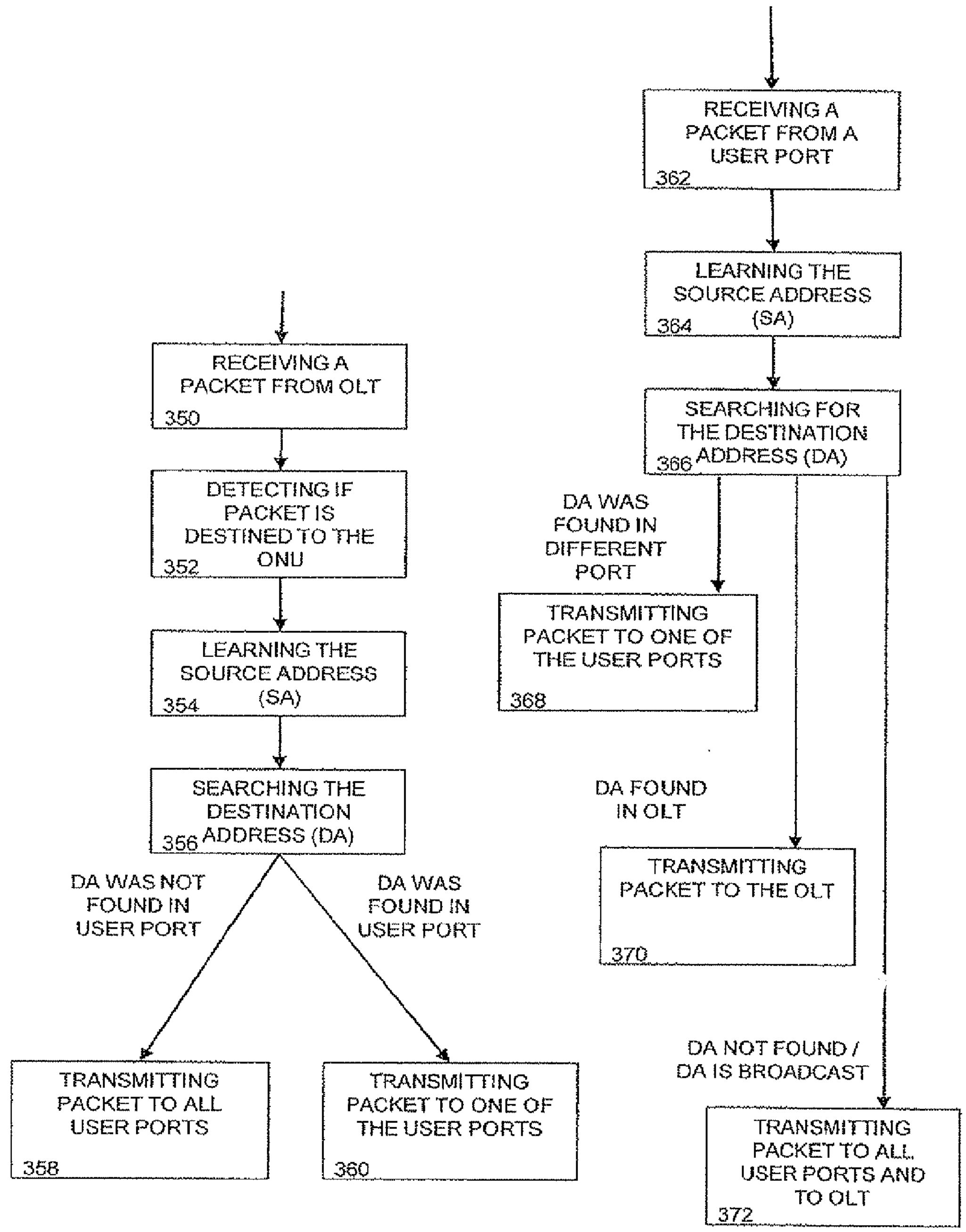

As with the existing methods described in FIGS. 3*a* and 3*b*, the method described in FIG. 9 includes two processes, shown on the left and on the right of the figure. The left process (steps 900-906) describes the actions taken by the ONU when a packet is received from an OLT. The right process (steps 908-916) describes the actions taken by the ONU when a packet is received from one of a plurality of user ports. The method for data flow optimization using a multiple entity ONU with a bridge essentially encompasses both processes.

The left process begins when a packet is received from the OLT in step 900. The packet preamble is compared with all the LLIDs registered for the specific multiple entity ONU in step 902. If one of the LLIDs registered with this ONU is found, the packet is directed to the port associated with the LLID in step 904. If the received LLID is classified as a "broadcast" LLID (i.e. it has a reserved LLID value destined for all ONUs), the packet is directed to all registered user ports in step 906. The major advantage in this process is that it removes the need of a Source Address learning step (e.g. in comparison with the left process of FIG. 3*b*), which reduces the complexity and the memory required from implementation. The removal of the need for (or avoidance of) the SA learning step is explained in more detail below.

The right process begins when a packet is received from any of a plurality of user ports inside the multiple entity ONU in step 908. This may also be referred to as an internal "originating" user port of the ONU. As in the right process of FIG. 3*b*, the Source Address of the packet is learned by the multiple entity ONU with a bridge in step 910, as arriving from the specific sending or originating port, based on the IEEE 802.1D specification. In step 912, the Destination Address of the packet is searched by the ONU inside the address database, which contains all the learned addresses. If the DA is found and matches a destination port different from the sending (originating) port, the packet is transmitted toward the destination port found in step 914. In other words, the ONU takes care of the traffic between its ports without the intervention of the OLT. If no matching DA is found for any port, the packet is transmitted only to the OLT in step 916. If the DA is classified as "broadcast" meaning its destination is to all ports, the packet is transmitted to the OLT and to all user ports, except the sending one, in step 918. The major advantages here are the ability of the OLT to control uplink bandwidth for each user port, and the handling of the internal traffic inside the ONU without the need to burden the uplink traffic, and without the need for the internal ONU traffic to be handled in the OLT.

The avoidance of SA learning in the process that includes receiving a packet from the OLT emerges from step 916. In existing art, if a DA is not found for any port in the search of step 912, a standard bridge will have to transmit the packet not only to the OLT, but to all other user ports of the ONU except the originating port. There are two reasons why a DA is not found in a search (step 916). The first is that the DA does not belong to any of the devices (ports) attached to an ONU, and the second is that the DA belongs to one of the attached devices, but has not been learned yet. The second reason is the only one that matters. The solution disclosed herein is based on the fact that the OLT also performs a DA search. The OLT will transmit the packet either to the correct ONU user port (when somehow the OLT knows the correct destination) or will feed it to all user ports in the PON except the originating one. The connectivity is guaranteed in either case, since when a user port receives the packet and answers, the SA is learned in step 910. A prior art ONU with a standard bridge must have the SA learning function for packets arriving from the OLT, or alternatively it must always reflect traffic from one user port to another user port. In other words, in prior art an ONU with a standard bridge must handle internally the traffic when a DA is not found, and it cannot rely on the OLT, as done in the present invention. The reason is that in prior art, an ONU looks like a single port to the OLT bridge. As such, the OLT must assume that if traffic was received from this ONU, it must not be reflected back when flooded when the DA is not found. As a result, the prior art ONU must reflect all unknown traffic, and in order to avoid these reflections, it must learn the OLT SA, in contrast with the ONU of the present invention, which does not have to learn the SA.

All publications mentioned in this specification are herein incorporated in their entirety by reference into the specification, to the same extent as if each individual publication was specifically and individually indicated to be incorporated herein by reference.

While the invention has been described with respect to a limited number of embodiments, it will be appreciated that many variations, modifications and other applications of the invention may be made. What has been described above is merely illustrative of the application of the principles of the present invention. Those skilled in the art can implement other arrangements and methods without departing from the spirit and scope of the present invention. In addition, citation or identification of any reference in this application shall not be construed as an admission that such reference is available as prior art to the present invention.

What is claimed is:

1. A method for packet data flow optimization in a passive optical network (PON) that includes an optical line terminal (OLT) and a plurality of optical network units (ONUs) of which at least one is a multiple entity ONU having a bridge, the method comprising the steps of:

- a. determining, by the multiple entity ONU, if a packet received by the multiple entity ONU:
  - i. originates from the OLT or from an originating user port; and
  - ii. is a broadcast packet or has a destination user port,
- b. if said packet originates from the OLT,
  - i. if said destination user port of said packet is according to the multiple entity ONU, transmitting said packet to said destination user port; and
  - ii. if said packet is a broadcast packet, transmitting said packet to all user ports of the multiple entity ONU, c. if said packet originates from said originating user port, the multiple entity ONU:
  i. learns said source address (SA) of said packet;
  ii. searches for a destination address of said packet on said multiple entity ONU;
  iii. if said destination address is not found, transmitting said packet solely to the OLT;
  iv. else
    A. if said packet has a destination user port, transmitting said packet to a user port; and
    B. if said packet is a broadcast packet, transmitting said packet to the OLT and all user ports except said originating user port, d. wherein the OLT
  i. upon receiving said packet, learns the SA of said packet; and
  ii. performs a search for said destination user port of said packet and subsequently:
    A. if said search results in the OLT knowing said destination user port, transmitting said packet to the multiple entity ONU having said destination user port; and
    B. else transmitting said packet to all user ports of the PON, except said originating user port.

2. The method of claim 1, wherein said step of transmitting said packet solely to the OLT is followed by the step of transmitting, by the OLT, of said packet to a user selected from the group of all user ports except said originating port and a particular user.

3. The method of claim 1, wherein said destination address found in said step of searching is a broadcast address, and wherein said step of transmitting said packet includes transmitting said packet to said OLT and all user ports except said originating user port.

* * * * *